US008543860B2

(12) United States Patent  
Beattie et al.

(10) Patent No.: US 8,543,860 B2  
(45) Date of Patent: Sep. 24, 2013

(54) MULTI-CORE CLOCKING SYSTEM WITH INTERLOCKED 'ANTI-FREEZE' MECHANISM

(75) Inventors: Derek Beattie, Glasgow (GB); Carl Culshaw, Wigan (GB); Alan Devine, Paisley (GB); James Andrew Collier Scobie, Helensburgh (GB)

(73) Assignee: Freescale Semiconductor, Inc., Austin, TX (US)

( * ) Notice: Subject to any disclaimer, the term of this patent is extended or adjusted under 35 U.S.C. 154(b) by 261 days.

(21) Appl. No.: 13/059,246

(22) PCT Filed: Aug. 26, 2008

(86) PCT No.: PCT/IB2008/053414  
§ 371 (c)(1),  
(2), (4) Date: Feb. 16, 2011

(87) PCT Pub. No.: WO2010/023501  
PCT Pub. Date: Mar. 4, 2010

(65) Prior Publication Data  
US 2011/0145625 A1    Jun. 16, 2011

(51) Int. Cl.  
*G06F 1/04* (2006.01)  
*G06F 1/00* (2006.01)  
*G06F 15/00* (2006.01)  
*G06F 11/00* (2006.01)

(52) U.S. Cl.  
USPC ............. 713/600; 713/375; 713/500; 712/28; 712/32; 714/10; 327/291

(58) Field of Classification Search  
USPC .................... 713/375, 500, 600; 712/28, 32; 714/10; 327/291  
See application file for complete search history.

(56) References Cited

U.S. PATENT DOCUMENTS

| 6,920,572 | B2 | 7/2005 | Nguyen et al. |
| 7,089,462 | B2 * | 8/2006 | Floyd et al. ...................... 714/55 |
| 7,839,194 | B2 * | 11/2010 | Chang et al. .................. 327/175 |
| 2002/0079943 | A1 | 6/2002 | Dubey |
| 2003/0163659 | A1 | 8/2003 | Audrain |

FOREIGN PATENT DOCUMENTS

WO    2006045779 A1    5/2006

OTHER PUBLICATIONS

Mueller M J et al: "Fully Redundant Clock Generation and Distribution with Dynamic Oscillator Switchover" IBM, J. Res. & Dev. vol. 51, No. 1/2, Jan./Mar. 2007, pp. 145-156.  
Jeon Hyun-Kyu et al: "Design of a Noise-Free Microcontroller" The Second IEEE Asia Pacific Conference on ASICs, Aug. 28-30, 2000, pp. 375-378.  
International Search Report and Written Opinion correlating to PCT/IB2008/053414 dated May 13, 2009.

* cited by examiner

Primary Examiner — Stefan Stoynov

(57) ABSTRACT

A clocking system, comprises a plurality of clocked data processing devices and a clock control circuit controlling a generation of a plurality of clock signals and an application of the clock signals to the plurality of data processing devices, allowing to clock at least one of the data processing devices while freezing all but the at least one of the data processing devices. A method for clocking a plurality of clocked data processing devices comprises controlling a generation of a plurality of clock signals and controlling an application of the clock signals to the plurality of data processing devices, allowing to clock at least one of the data processing devices while freezing all but the at least one of the data processing devices.

20 Claims, 6 Drawing Sheets

MULTI-CORE CLOCKING SYSTEM WITH INTERLOCKED 'ANTI-FREEZE' MECHANISM

FIELD OF THE INVENTION

This invention in general relates to clocked data processing devices and more specifically to a system and method for clocking multiple processor cores.

BACKGROUND OF THE INVENTION

Processing power of a system can be increased by using multiprocessor systems. Multiprocessing is the use of two or more processors, for example central processing units (CPUs) or microcontrollers, within a single data processing system. A microcontroller incorporates most or all of the functions of a CPU on a single integrated circuit (IC). Instead of using multiple processors or microcontrollers, each with one processor core, a multi-core CPU or multi-core microcontroller, i.e. a chip-level multiprocessor, can be used. A multi-core microprocessor combines two or more independent data processing cores into a single package composed of a single IC, or die, or more dies packaged together.

In a typical multi-core system, all cores are being clocked simultaneously and by the same clock source. The clock rate is the fundamental rate in cycles per second at which a data processing device, for example a processor core, performs its most basic operations such as adding two numbers or transferring a value from one processor register to another. If any erroneous activity causes a disturbance of the clock signal of a multi-core or multiprocessor system, it could have a detrimental effect on the operation of any or all of the cores. Such an effect could be caused by any environmental disturbance, such as noise, radiation, over-voltages, current injection etc., and could have a significant safety implication for the system if any of the cores experience code runaway, for example causing system instability, freezing or failure. In functional safety applications, such as vehicle brake or electrical steering systems, such a malfunction could induce a dangerous situation.

In order to provide a reliable clock signal for clocking multiple data processing devices, two redundant sources of clock generation can be used, as described in "Fully redundant clock generation and distribution with dynamic oscillator switchover", IBM System z9, volume 51, number 1/2, 2007. However, both clocks can be disturbed by the same event, since some elements of the system are shared. Other systems, such as the system described in document U.S. Pat. No. 6,920,572 B2, use the same clock source but comprise a clock tree that distributes clock signals to processor cores and a common shared component. The clock tree can be configured to disable one or more of the processor cores and shared component by blocking the corresponding clock signal. The clock signal for the shared component is preserved until the shared component is disabled by all of the processor cores. Therefore, one disturbance event can still affect the clock to multiple cores since some elements, such as power supply, are shared.

It is also possible to dedicate additional circuitry to the monitoring of possible sources of disturbance, for example the power noise a microcontroller encounters, and to reset, freeze or stop the system in order to preserve it from malfunction, as described in "Design of a noise-free microcontroller", Hyundai Electron. Co. Ltd., ISBN: 0-7803-6470-8. Freezing a clocked device refers to providing the device with no or a constant clock signal having no signal changes from low to high or vice versa, causing the device to preserve the last state of processing, for example contents of registers and logic circuitry, until a next clock edge continues triggering the data processing.

SUMMARY OF THE INVENTION

The present invention provides a clocking system and a method for clocking a plurality of clocked data processing devices as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
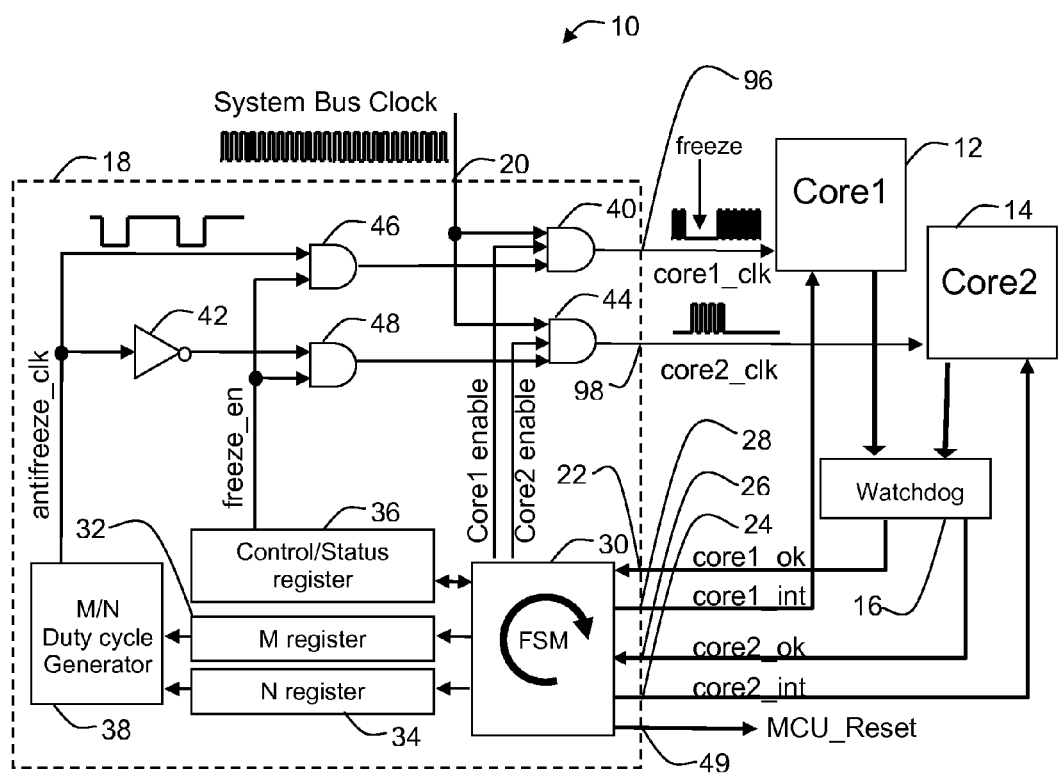
FIG. 1 schematically shows a block diagram of an example of an embodiment of a clocking system.

Referring to FIG. 1, a schematic block diagram of an example of an embodiment of a clocking system 10 is shown. A clocking system 10 is presented, comprising a plurality of clocked data processing devices 12, 14 and a clock control circuit 18 controlling a generation of a plurality of clock signals and an application of the clock signals to the plurality of data processing devices 12, 14, allowing to clock at least one of the data processing devices while freezing all but the at least one of the data processing devices. The system allows the data processing devices 12, 14 to be clocked from the same clock source without a clock disturbance affecting all data processing devices simultaneously. The plurality of data processing devices 12, 14 may comprise a processor core of a multi-core device. A multi-core device implements multiprocessing in a single physical package. Multiple processor cores contained in the same multi-core device may easily be subject to the same disturbances, since they share, for example, the same environment, changes of ambient temperature, noise, glitches of power supply etc. And the plurality of data processing devices 12, 14 may comprise a processor core of a single-core device. For example a multiprocessor comprising two or more single-core processors may also receive its clock according to the shown clocking system. Even a combination of multi-core and single-core devices may be part of a clocking system as described here. A multi-core device may be a multi-core microcontroller. A microcontroller is a computer-on-a-chip, containing a processor, memory, and input/output functions. A microprocessor emphasizes high integration, in contrast to a general-purpose microprocessor, for example a central processing unit (CPU) contained in a PC. In addition to the arithmetic and logic elements of a general purpose microprocessor, a microcontroller may integrate additional elements such as read-write memory for data storage, read-only memory for program storage, EEPROM for permanent data storage, and peripheral devices. The provided clocking system offers a high level of system stability. It reduces the possibility that all processing devices may be disturbed at the same time. Therefore it may be possible to let the system enter a safe state at any time. This is a relevant aspect especially for safety critical systems, for example used in automotive applications, where microcontrollers may be used. However, a multi-core device may also be any other multi-core processor, for example a multi-core digital signal processor (DSP) or a multi-core general purpose processor (GPP), such as a CPU. Accordingly a single-core device may be a single-core microcontroller. Or it may be any other single-core processor, for example a DSP or a GPP. In the illustrated example, a clocking system 10 having two data processing devices 12, 14, that are processor cores core1 and core2, receive their clock signals core1_clk and core2_clk from a clock control circuit 18. Each core comprises a first input for the corresponding clock signal and a second input for receiving an interrupt signal from the clock control circuit connected to the cores. Furthermore, each core comprises an output connected to a "watchdog" device 16. A task of such a device 16 may be detecting a disturbance event of one of the clock signals. The watchdog activity is an independent mechanism for checking that the data processing device is operating correctly. This can be done, for example, by a checkerboard write/inverse-checkerboard write within a predefined time. The watchdog will generate a reset-event, if a disturbance is detected. Apart from the interface shown in FIG. 1 schematic block diagram, a processor core may comprise a variety of other input and output terminals, for example for processing data input and output. The watchdog device 16 is shown as a common device shared between all of the processor cores. However, it could be implemented as a plurality of devices, for example one for each processor core. The watchdog 16 is connected to the clock control circuit 18 and provides output core status signals core1_ok and core2_ok to control circuit 18. The watchdog passes the status core1_ok or core2_ok to the clock control circuit, if the corresponding interrupt signal is set. Setting a signal refers to changing the state of a digital signal from low to high, or vice versa, depending on the signal logic definition of the implementation. The clock control circuit 18 generates clock signals for assigned cores 12, 14 of the clocking system 10 from a single input system bus clock. It comprises an input terminal 20 for receiving the system bus clock signal, input terminals 22, 24 for receiving the status signals core1_ok and core2_ok, output terminals 26, 28 for passing interrupt signal core1_int and core2_int to the corresponding cores 12, 14, and output terminals 96, 98 for providing clock signals core1_clk and core2_clk to cores 12, 14. Furthermore, it comprises an output terminal 49 for passing a reset signal MCU_Reset (MCU—MicroController Unit) to the multi-core device having cores 12 and 14. The clock control circuit 18 further comprises an embodiment of a finite state machine FSM 30. A FSM is a model of behaviour composed of a finite number of states, transitions between those states, and actions. A finite state machine is an abstract model of a machine with an internal memory. The embodiment of the FSM 30 used in control circuit 18 may be composed of logic circuits or may be implemented in a programmable logic device, such as a field programmable gate array (FPGA), an application-specific integrated circuit (ASIC), using a hardware description language or may be implemented as software for a programmable apparatus. The FSM 30 receives status signals core1_ok and core2_ok, passes interrupts core1_int to core1 and core2_int to core2, respectively, and may reset the complete multiprocessor by sending a MCU_Reset via terminal 49. It controls a determination of duty cycle numbers M and N. A duty cycle number is a number of clock cycles of the system bus clock assigned to be used for clocking a corresponding data processing device. Therefore, the duration of a duty cycle is the corresponding duty cycle number times a duration of a cycle of the system bus clock. FSM 30 stores M and N in registers 32, 34 and reads and writes status information from/to a control/status register 36. Registers 32, 34 provide M and N to a duty cycle generator 38. For the shown example of two processor cores requiring a clock signal, this generator circuit generates an anti-freeze clock signal antifreeze_clk having a M/N ratio of duration of active high state and low state. In order to generate core1_clk signal from antifreeze_clk and the system bus clock signal received via terminal 20, both signals are applied to logic AND-gate 40. Hence, core1_clk is the system bus clock signal having an envelope according to antifreeze_clk, therefore freezing core1 each time antifreeze_clk is in low state. Gate 40 provides a third input for receiving a Core1_enable signal from FSM 30. Setting this signal to low allows FSM 30 to disable core1 clock signal core1_clk and completely freeze core1. For the shown example embodiment having two cores 12, 14, core2 clock signal core2_clk is the inverse of core1_clk. Therefore, inverter 42 inverts the generated antifreeze_clk signal. The inverted signal and system bus clock are applied to a second AND-gate 44, that outputs core2_clk signal, if Core2_enable applied to AND-gate 44 is set to active high by FSM 30. Control/status register 36 stores an information, whether the described alternate clocking mode should be used. Only if mode signal freeze_en provided by control/status register 36 is active high, two additional AND-gates 46, 48 will interconnect antifreeze_clk and its inverted signal to corresponding AND-gates 40 and 44, respectively.

Figure 2:
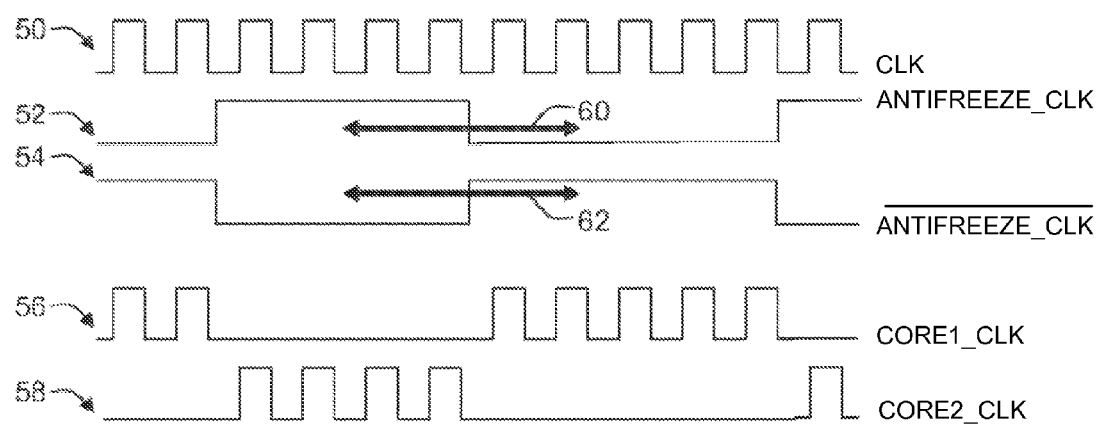
FIG. 2 schematically shows a diagram of an example of a clock operation scheme of a clocking system.

FIG. 2 schematically shows a diagram of an example of a clock operation scheme of a clocking system 10. Plot 50 illustrates a system bus clock signal, plot 52 an anti-freeze clock signal antifreeze_clk, i.e. a duty cycle clock freeze signal as generated by duty cycle generator 38, plot 54 an inverted anti-freeze signal, and plot 56 the output core 1 clock signal core1_clk generated by the clock control circuit and plot 58 the corresponding core 2 clock signal core2_clk. Changing the ratio of M and N will change anti-freeze clock signal as indicated by arrows 60, 62. It can be seen that a variable duty cycle clock freeze signals antifreeze_clk may be used to temporarily enable/disable a main system clock or system bus clock signal to each core. The freeze signals, generated and controlled by the clock control circuit 18 shown in plots 52 and 54 are in anti-phase to each other. Since only one core receives a clocking at a time, any perturbation of the clock signal may be seen only by one core. One core will receive a clock signal at a time, while freezing the other cores. However, it is possible and within the scope of this invention to have more than one core receiving a clock signal at a time, while freezing the remaining cores. In general, the freezing of all but the at least one of the data processing devices may prohibit a clock disturbance of the all but the at least one of the data processing devices by a clock disturbance of the at least one data processing device. It may prohibit a simultaneous disturbance of active and frozen data processing devices. The duty cycle number can be assigned by the clock control circuit. However, it may be prohibited to assign all available processing time to one core. For two data processing devices or cores receiving duty cycle numbers M and N, N=0 or M=0 may be prohibited. Hence, at least one data processing device may not be affected by any clock disturbance. Therefore, at least one data processing device may remain for system recovery. However, the clock control circuit 18 may be configured to adjust a time division between the clock signals (core1_clk, core2_clk) by a variation of a duty cycle of at least one of the plurality of data processing devices. Duty cycle numbers depend on the system and the application assigned to the data processing devices. In a dual core case, values may for example be equal and each core may be clocked alternately. Any other ratios of duty cycle numbers are possible, such as 1:2, 1:4, 1:10, 2:3, 9:5, 23:54, 10:1 etc. for a dual core system, for example for applications where the second core operates as an input/output processor (IOP). The variation of a duty cycle for a data processing device will affect at least the duty cycle assigned to a second data processing device. The clock control circuit may determine an optimum clock delivery depending on a status signal (core1_ok, core2_ok) received from a plurality of the data processing devices 12, 14. Furthermore, the clock control circuit 18 is operable to prevent a failure of the clocking system by resetting, freezing and stopping the clocking system. FSM 30 may decide in response to the received core status signals to change the control/status register 36 and set freeze_en to low state, thereby setting all core clock signals to low state. It may also send MCU_Reset for resetting the system or stop the clocking system.

One of the plurality of data processing devices may be a master device allowed to adjust the ratio of clock cycles driven to each of the plurality of data processing devices. From start up or reset, one of the cores 12, 14 may be the master and may be the only core clocked for a finite initialisation period. During this period the master may adjust the ratio of clock cycles assigned to each core. However, if the master fails to initialise correctly, as determined by the watchdog 16, its operation as the master may be suspended and a secondary core may become the master. The clock control circuit 18 is operable to suspend the master device and select one of the plurality of data processing devices 12, 14 as a new master device. If only the second core is clocked, at least if this is the only remaining core being clocked, the system may enter a safe state. The safe state may provide only restricted performance.

If the master device initialises correctly, it may be operable to enable and disable the freezing of all but at least one of the data processing devices 12, 14. Thus, the complete freeze/anti-freeze mode of operation may be enabled or disabled or re-enabled according to decision by the master device.

Figure 3:
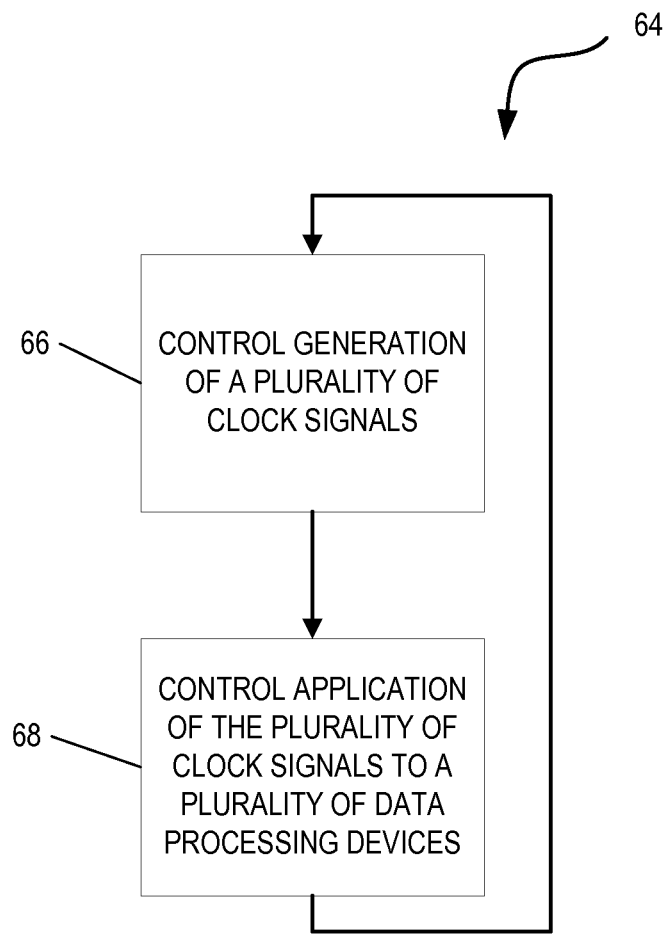
FIG. 3 schematically shows a flow diagram of a first example of an embodiment of a method for clocking a plurality of clocked data processing devices.

Referring now also to FIG. 3, a schematic diagram of a first example of an embodiment of a method for clocking a plurality of clocked data processing devices is shown. The illustrated method 64 for clocking a plurality of clocked data processing devices 12, 14 comprises controlling a generation 66 of a plurality of clock signals and controlling an application 68 of the clock signals to the plurality of data processing devices 12, 14, allowing to clock at least one of the data processing devices while freezing all but the at least one of the data processing devices.

Figure 4:
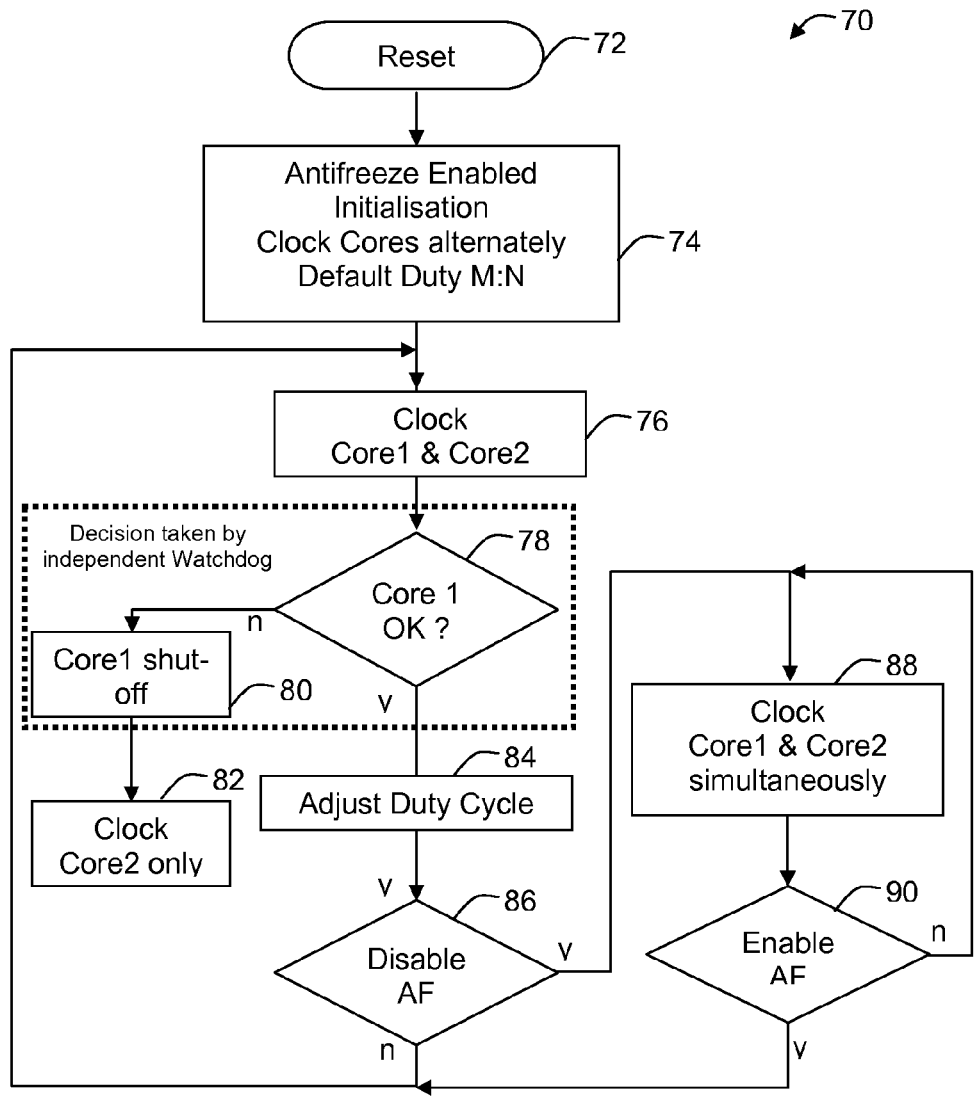
FIG. 4 schematically shows a flow diagram of a second example of an embodiment of a method for clocking a plurality of clocked data processing devices.

Referring now also to FIG. 4, a schematic flow diagram of a second example of an embodiment of a method for clocking a plurality of clocked data processing devices is shown. The illustrated method 70 for clocking a plurality of clocked data processing devices may begin with a start-up or reset 72 and may comprise initialising and setting 74 anti-freeze mode of operation enabled. After the correct mode for performing the shown method is selected, a master device may be determined (core 1 in FIG. 4.) and during an initialisation period, the master clock may be the only core being clocked. During this period the master may adjust the ratio of clock cycles driven to each core. If it fails to initialise correctly, core operation may be suspended and another core may be selected as the master core and the system may enters a safe state. If initialisation is performed correctly, the plurality of data processing devices, which are processor cores in the shown example, may be clocked alternately, i.e. each of the cores may receive a clock signal for a number of system bus clock cycles corresponding to a default duty cycle number, for example M and N, assigned by the master core, for a clocking system having two cores. In a next clocking step 76, each of the data processing devices may be clocked alternately. Afterwards, a checking 78, if the master core works correctly, may be performed. If the master core does not function correctly, the next step may be shutting off 80 the master core and selecting 82 one of the plurality of data processing devices as a new master device. Otherwise, i.e. if the master core functions correctly, the next steps may be adjusting 84 duty cycles of the plurality of data processing devices and deciding 86, whether the anti-freeze mode for clocking a core while freezing other cores, is to be disabled. If the anti-freeze mode is disabled, a clocking 88 of each of the data processing devices simultaneously is performed, which is the mode of operation of any standard multi-core device. The method then comprises a step of checking 90, whether the anti-freeze mode may be enabled. If the anti-freeze mode is not activated, the cores continue being clocked simultaneously. If the anti-freeze mode is enabled or if it has not been disabled before and no simultaneous clocking was performed before, the method may loop back to the stage of clocking 76 each of the data processing devices alternately.

Any system for clocking a plurality of clocked data processing devices may execute steps of a method as described above.

Figure 5:
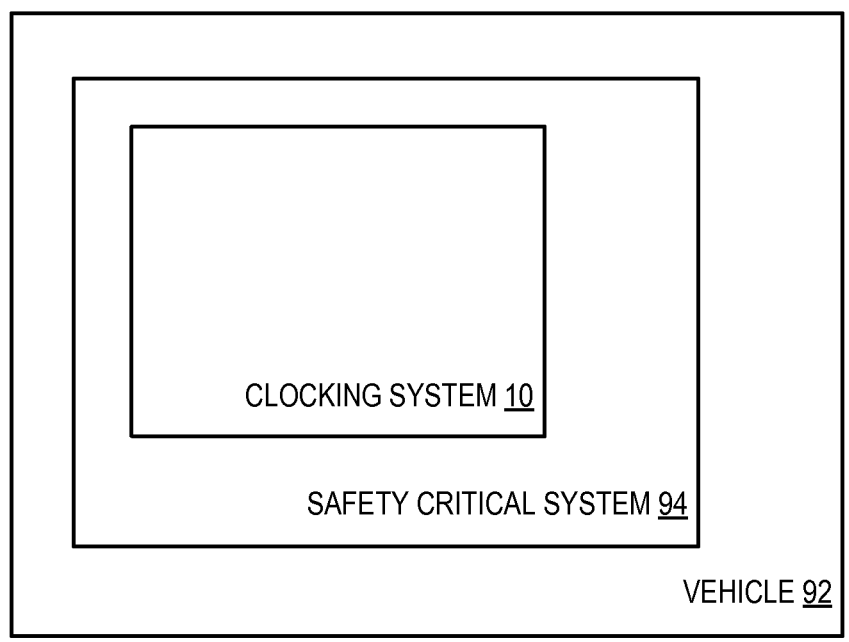
FIG. 5 schematically shows a block diagram of an example of an embodiment of a vehicle comprising a safety critical system comprising a clocking system.

Referring now to also FIG. 5, a schematic block diagram of an example of an embodiment of a vehicle comprising a safety critical system comprising a clocking system is shown. A safety critical system 94, i.e. a system used in an environment where safety and avoidance of system failure is a critical issue, may comprise a clocking system 10 or may use a clocking method as described above. Since the presented clocking system provides robustness and functional safety against, for example, glitches on the clock signals for multi-core systems, the system or the corresponding method may be used in safety critical environments, where an unexpected system failure or freezing may result in a dangerous situation. A safety critical system may be found, for example, in an automotive environment and may be, for example, a car safety system. A safety critical system may comprise a brake system or an electrical steering system. A brake system may comprise, for example, an anti-lock braking system (ABS), an electronic brakeforce distribution system (EBD), a cornering brake control (CBC) system etc. An electrical steering system may comprise, for example, an electronic stability control system (ESC), a traction control system (TCS) or anti-slip regulation system (ASR), an adaptive cruise control (ACC) system, a forward collision warning (FCW) system etc. Therefore, a vehicle 92 may comprise a clocking system 10 or a safety critical system 94 or may use a method as described above. A vehicle may be a car. However, it may be any automotive apparatus, such as a plane, a ship, a helicopter etc.

Figure 6:
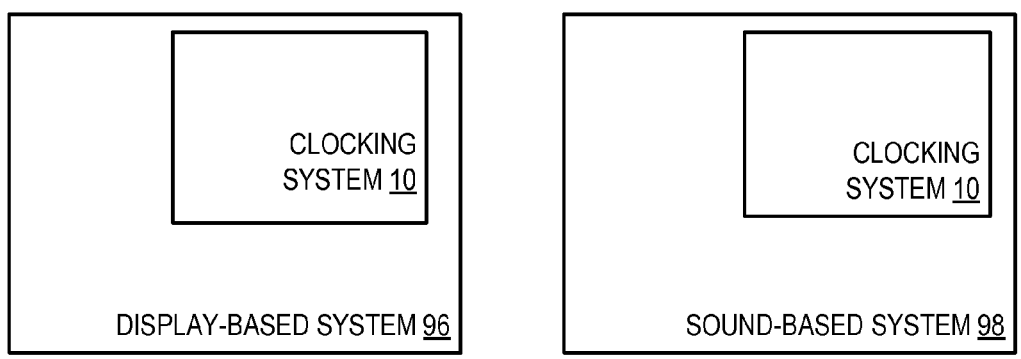
FIG. 6 schematically shows a block diagram of an example of an embodiment of a display-based or a sound-based system comprising a clocking system.

Referring now to FIG. 6, a schematic block diagram of an example of an embodiment of a display-based 96 or sound-based 98 system comprising a clocking system 10 is shown. A display-based system is a system that comprises a display for displaying data according to the targeted field of application. For example, it may be a control panel of an instrument, a camera having or being operable to be connected to a display, a video projector, a phone having or being operable to be connected to a display, a personal digital assistant (PDA) etc. A system disturbance caused by a malfunction of a processor contained in or associated with the system may result in a reduced visual performance of the system. A sound-based system is a system that comprises a device for at least partly playing, recording or manipulating a sound, i.e. an audible signal, music, speech etc. For example, it may be a hi-fi system, a noise cancellation device, a music instrument, a sound mixer etc. A system disturbance caused by a malfunction of a processor contained in or associated with the system may result in a reduced audio performance of the system. Therefore, a display-based system or a sound-based system may comprise a clocking system or use a clocking method as described above. A display-based system or a sound-based system as described above may be comprised in a vehicle or any other apparatus using or providing visual or audible data. Moreover, a computer program product may comprise code portions for executing steps of a method for clocking a plurality of clocked data processing devices, when run on a programmable apparatus.

Furthermore, a computer program product may comprise code portions for implementing parts of a clocking system as described above, when run on a programmable apparatus.

An operating system (OS) is the software that manages the sharing of the resources of a computer and provides programmers with an interface used to access those resources. An operating system processes system data and user input, and responds by allocating and managing tasks and internal system resources as a service to users and programs of the system.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the system implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, cores 12, 14 and clock control circuit may be located on a same integrated circuit or on a separate integrated circuit or located within another peripheral or slave discretely separate from other elements of system 10. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 35 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A clocking system, comprising:
    a plurality of clocked data processing devices; and
    a clock control circuit controlling a generation of a plurality of clock signals and an application of said clock signals to said plurality of data processing devices, allowing to clock at least one of said data processing devices while freezing all but said at least one of said data processing devices, wherein said clock control circuit is configured to adjust a time division between said clock signals by a variation of a duty cycle of at least one of said plurality of said data processing devices.

2. The clocking system as claimed in claim 1, wherein said plurality of data processing devices comprises a processor core of a multi-core device.

3. The clocking system as claimed in claim 1, wherein said plurality of data processing devices comprises a processor core of a single-core device.

4. The clocking system as claimed in claim 1, wherein said freezing of all but said at least one of said data processing devices prohibits a clock disturbance of said all but said at least one of said data processing devices by a clock disturbance of said at least one data processing device.

5. The clocking system as claimed in claim 1, comprising a device for detecting a disturbance event of one of said clock signals.

6. The clocking system as claimed in claim 1, wherein said clock control circuit is operable to prevent a failure by resetting, freezing and stopping said clocking system.

7. The clocking system as claimed in claim 1, wherein one of said plurality of data processing devices is a master device allowed to adjust the ratio of clock cycles driven to each of said plurality of data processing devices.

8. The clocking system as claimed in claim 7, wherein said master device is operable to enable and disable said freezing of all but said at least one of said data processing devices.

9. The clocking system as claimed in claim 7, wherein said clock control circuit is operable to suspend said master device and select one of said plurality of data processing devices as a new master device.

10. A method for clocking a plurality of clocked data processing devices, comprising:
    controlling a generation of a plurality of clock signals; and
    controlling an application of said clock signals to said plurality of data processing devices, allowing to clock at least one of said data processing devices while freezing all but said at least one of said data processing devices, wherein a time division between said clock signals is adjusted by a variation of a duty cycle of at least one of said plurality of said data processing devices.

11. The method as claimed in claim 10, comprising:
    initialising and setting anti-freeze mode of operation enabled;
    clocking each of said data processing devices alternately;
    checking, if a master device works correctly;
    if said master device does not function correctly,
        shutting off said master device; and
        selecting one of said plurality of data processing devices as a new master device;
    if said master device functions correctly,
        adjusting duty cycles of said plurality of data processing devices; and
        deciding, whether said anti-freeze mode is to be disabled;
    if said anti-freeze mode is disabled,
        clocking each of said data processing devices simultaneously; and
        checking, whether said anti-freeze mode may be enabled; and
    if said anti-freeze mode is enabled,
        repeating clocking each of said data processing devices alternately.

12. A clocking system, comprising:
    a first processor;
    a second processor;
    a clock control circuit operable to:
        determine a duty cycle;
        provide a system clock to the first processor and to freeze the system clock to the second processor during a first portion of the duty cycle; and
        provide the system clock to the second processor and to freeze the system clock to the first processor during a second portion of the duty cycle.

13. The clocking system of claim 12, further comprising:
    a third data processor;
    wherein the clock control circuit is further operable to:
        provide the system clock to the third processor during the first portion of the duty cycle; and
        freeze the system clock to the third processor during the second portion of the duty cycle.

14. The clocking system of claim 12, wherein:
    the first processor comprises a first core of a multi-core processor; and
    the second processor comprises a second core of the multi-core processor.

15. The clocking system of claim 12, wherein:
    the first processor comprises a first single-core processor; and
    the second processor comprises a second single-core processor.

16. The clocking system of claim 12, further comprising:
    a watchdog device coupled to the first processor and the second processor, and operable to detect a disturbance on one or more of the first processor and the second processor.

17. The clocking system of claim 12, wherein the clock control circuit is further operable to prevent a failure by resetting the clocking system.

18. The clocking system of claim 12, wherein the first processor operates as a master device to adjust the duty cycle.

19. The clocking system of claim 18, wherein the master device further operates to enable and disable the freezing of the system clock to the first processor and to the second processor.

20. The clocking system of claim 18, wherein the clock control circuit is further operable to suspend deselect the first processor as the master device and to select the second processor as the master device.

* * * * *